US012738172B2

(12) United States Patent
Baladhandapani et al.

(10) Patent No.: US 12,738,172 B2
(45) Date of Patent: Sep. 15, 2026

(54) SYSTEMS AND METHODS FOR PROVIDING SITUATIONAL TRAFFIC AIRCRAFT AWARENESS

(71) Applicant: HONEYWELL INTERNATIONAL INC., Charlotte, NC (US)

(72) Inventors: Gobinathan Baladhandapani, Madurai (IN); Karthikeyan M, Madurai (IN); Sivaraman Saptharishi, Bangalore (IN); Sivakumar Kanagarajan, Bangalore (IN); Muthusankar Subramaniyan, Brno (CZ)

(73) Assignee: Honeywell Aerospace US LLC, Phoenix, AZ (US)

( * ) Notice: Subject to any disclaimer, the term of this patent is extended or adjusted under 35 U.S.C. 154(b) by 0 days.

(21) Appl. No.: 19/091,306

(22) Filed: Mar. 26, 2025

(65) Prior Publication Data

US 2026/0237308 A1 Aug. 13, 2026

(51) Int. Cl.
*G08G 5/00* (2025.01)
*G08G 5/21* (2025.01)
(Continued)

(52) U.S. Cl.
CPC ............... *G08G 5/723* (2025.01); *G08G 5/21* (2025.01); *G08G 5/265* (2025.01)

(58) Field of Classification Search
CPC ... G08G 5/00; G08G 5/02; G08G 5/04; G01S 5/14; G06F 3/02
See application file for complete search history.

(56) References Cited

U.S. PATENT DOCUMENTS

| | | | | |
|---|---|---|---|---|
| 6,271,768 | B1 * | 8/2001 | Frazier, Jr. | G08G 5/55 340/961 |
| 6,381,519 | B1 * | 4/2002 | Snyder | G01C 23/00 244/175 |

(Continued)

FOREIGN PATENT DOCUMENTS

| | | | |
|---|---|---|---|
| EP | 4276794 | A1 | 11/2023 |
| JP | 4390118 | B2 | 12/2009 |

OTHER PUBLICATIONS

Wikipedia, 2002 Uberlingen Mid-Air Collision, downloaded from https://en.wikipedia.org/wiki/2002_%C3%9Cberlingen_mid-air_collision on Feb. 7, 2025.

(Continued)

*Primary Examiner* — Tan Q Nguyen
(74) *Attorney, Agent, or Firm* — Ingrassia Fisher & Lorenz

(57) ABSTRACT

Traffic aircraft data including an aircraft identifier and a traffic aircraft location is received for a plurality of traffic aircraft. A traffic aircraft display including graphical representations of an aircraft at an aircraft location, the plurality of traffic aircraft at the associated traffic aircraft locations, and a preview element is generated for display on a display device. Clearance messages including the aircraft identifier, a time stamp, and clearance data associated with the traffic aircraft is received and stored in a traffic aircraft clearance table. Upon selection of a traffic aircraft and the preview element from the traffic aircraft display, clearance data corresponding to the aircraft identifier associated with the selected aircraft having a first time-stamp and a second time-stamp is retrieved from the traffic clearance table. The traffic aircraft display is regenerated to include the clearance data as a tag associated with the graphical representation of the selected traffic aircraft.

20 Claims, 8 Drawing Sheets

(51) Int. Cl.

*G08G 5/265* (2025.01)
*G08G 5/72* (2025.01)
*G01S 5/14* (2006.01)

(56) References Cited

U.S. PATENT DOCUMENTS

| | | | | |
|---|---|---|---|---|
| 8,704,701 | B2 | 4/2014 | Pschierer et al. | |
| 9,405,005 | B1 * | 8/2016 | Arteaga | G08G 5/55 |
| 9,437,112 | B1 * | 9/2016 | Greene | G08G 5/723 |
| 2002/0011950 | A1 * | 1/2002 | Frazier | G01C 23/00 342/30 |
| 2005/0049762 | A1 * | 3/2005 | Dwyer | G01C 23/00 701/3 |
| 2007/0299611 | A1 * | 12/2007 | Winkler | G01C 23/005 701/301 |
| 2011/0125399 | A1 | 5/2011 | Clark et al. | |
| 2011/0291861 | A1 | 12/2011 | Meunier et al. | |
| 2023/0074014 | A1 * | 3/2023 | Shamasundar | G08G 5/76 |
| 2023/0386344 | A1 | 11/2023 | Agarwal | |
| 2024/0265814 | A1 | 8/2024 | Gettler, Jr. | |

OTHER PUBLICATIONS

Hradecky, Simon, "Incident: NAC B744 Near New Delhi on Dec. 23, 2018, Climb without Clearance Causes Loss of Separation with Two Aircraft," The Aviation Herald, Dec. 18, 2018, downloaded from https://avherald.com/h?article=4c2289f3&opt=4864 on Feb. 7, 2025.

"Loss of Separation at Sector Boundaries," Skybrary, downloaded from https://skybrary.aero/articles/loss-separation-sector-boundaries on Feb. 7, 2025.

Eurocontrol, "Operational Safety Study Low Level Go Around," Jan. 19, 2019, downloaded from https://skybrary.aero/sites/default/files/bookshelf/4627.pdf on Feb. 7, 2025.

* cited by examiner

SYSTEMS AND METHODS FOR PROVIDING SITUATIONAL TRAFFIC AIRCRAFT AWARENESS

CROSS REFERENCE TO RELATED APPLICATION

This application claims priority to India Provisional Patent Application No. 202511011391, filed Feb. 11, 2025, the entire content of which is incorporated by reference herein.

TECHNICAL FIELD

The present invention generally relates to vehicle operations and more particularly relates to systems and methods for providing situational traffic aircraft awareness.

BACKGROUND

When a pilot is flying an aircraft into an airport for landing or departing from the airport during take-off, the pilot may be interested in having insight into arrival trends and departure trends based on traffic aircraft flow at the airport. The pilot may also be interested in viewing an intent of a traffic aircraft based on clearance messages associated with that traffic aircraft when the pilot is flying the aircraft at a non-towered airport. Current avionics typically overlay traffic aircraft locations into a navigation display of a map display onboard the aircraft.

Hence, there is a need for systems and methods for providing situational traffic aircraft awareness.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In various embodiments, a method for providing situational traffic aircraft awareness in an aircraft includes: receiving, at a controller, an aircraft location of the aircraft from at least one geospatial sensor of the aircraft; receiving, at a controller, traffic aircraft data including an aircraft identifier and a traffic aircraft location for each of a plurality of traffic aircraft from Automatic Dependent Surveillance-Broadcast (ADS-B); generating, by the controller, a traffic aircraft display based on the aircraft location and the traffic aircraft data for display on a first display device on the aircraft, wherein the traffic aircraft display comprises a graphical representation of the aircraft at the aircraft location, graphical representations of each of the plurality of traffic aircraft at the associated traffic aircraft locations, and a selectable preview element; receiving, at the controller, a plurality of clearance messages, wherein each of the plurality of clearance messages is associated with one of the plurality of traffic aircraft and comprises the aircraft identifier, a time stamp, and clearance data associated with the one of the plurality of traffic aircraft; storing, by the controller, the aircraft identifier in association with the clearance data and the time stamp for each of the plurality of traffic aircraft in a traffic aircraft clearance table; receiving, at the controller, a selection of the graphical representation of a first traffic aircraft from the traffic aircraft display, the first traffic aircraft having a first aircraft identifier and a selection of the preview element; retrieving, by the controller, first clearance data corresponding to the first aircraft identifier having a first time-stamp and second clearance data corresponding to the first aircraft having a second time-stamp from the traffic clearance table responsive to the selection of the preview element, wherein the second time-stamp is prior to the first-time stamp; and regenerating, by the controller, the traffic aircraft display to include the first and second clearance data as a first tag associated with the graphical representation of the first traffic aircraft.

In various embodiments, a situational traffic aircraft awareness system includes at least one processor and at least one memory communicatively coupled to the at least one processor. The at least one memory includes instructions that, upon execution by the at least one processor, cause the at least one processor to: receive an aircraft location of the aircraft from at least one geospatial sensor of the aircraft; receive traffic aircraft data including an aircraft identifier and a traffic aircraft location for each of a plurality of traffic aircraft from Automatic Dependent Surveillance-Broadcast (ADS-B); generate a traffic aircraft display based on the aircraft location and the traffic aircraft data for display on a first display device on the aircraft, wherein the traffic aircraft display comprises a graphical representation of the aircraft at the aircraft location, graphical representations of each of the plurality of traffic aircraft at the associated traffic aircraft locations, and a selectable preview element; receive a plurality of clearance messages, wherein each of the plurality of clearance messages is associated with one of the plurality of traffic aircraft and comprises the aircraft identifier, a time stamp, and clearance data associated with the one of the plurality of traffic aircraft; store the aircraft identifier in association with the clearance data and the time stamp for each of the plurality of traffic aircraft in a traffic aircraft clearance table; receive a selection of the graphical representation of a first traffic aircraft from the traffic aircraft display, the first traffic aircraft having a first aircraft identifier and a selection of the preview element; retrieve first clearance data corresponding to the first aircraft identifier having a first time-stamp and second clearance data corresponding to the first aircraft having a second time-stamp from the traffic clearance table responsive to the selection of the preview element, wherein the second time-stamp is prior to the first-time stamp; and regenerate the traffic aircraft display to include the first and second clearance data as a first tag associated with the graphical representation of the first traffic aircraft.

In various embodiments, at least one non-transitory machine-readable storage medium stores instructions executable by at least one processor. The instructions are configurable to cause the at least one processor to perform operations comprising: receiving an aircraft location of the aircraft from at least one geospatial sensor of the aircraft; receiving traffic aircraft data including an aircraft identifier and a traffic aircraft location for each of a plurality of traffic aircraft from Automatic Dependent Surveillance-Broadcast (ADS-B); generating a traffic aircraft display based on the aircraft location and the traffic aircraft data for display on a first display device on the aircraft, wherein the traffic aircraft display comprises a graphical representation of the aircraft at the aircraft location, graphical representations of each of the plurality of traffic aircraft at the associated traffic aircraft locations, and a selectable preview element; receiving a plurality of clearance messages, wherein each of the plurality of clearance messages is associated with one of the plurality of traffic aircraft and comprises the aircraft identifier, a time stamp, and clearance data associated with the one of the plurality of traffic aircraft; storing the aircraft identifier in association with the clearance data and the time stamp for each of the plurality of traffic aircraft in a traffic aircraft clearance table; receiving a selection of the graphical representation of a first traffic aircraft from the traffic aircraft display, the first traffic aircraft having a first aircraft identifier and a selection of the preview element; retrieving first clearance data corresponding to the first aircraft identifier having a first time-stamp and second clearance data corresponding to the first aircraft having a second time-stamp from the traffic clearance table responsive to the selection of the preview element, wherein the second time-stamp is prior to the first-time stamp; and regenerating the traffic aircraft display to include the first and second clearance data as a first tag associated with the graphical representation of the first traffic aircraft.

Furthermore, other desirable features and characteristics of the systems and methods for providing situational traffic aircraft awareness become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Figure 1:
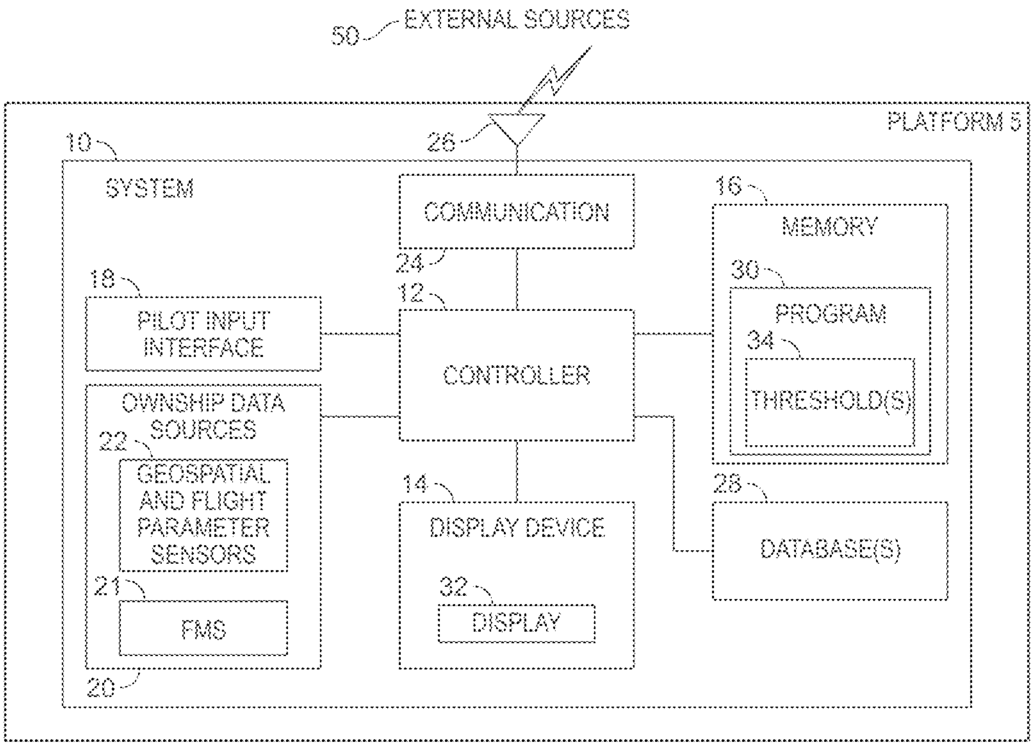
FIG. 1 is a block diagram representation of a system configured to provide situational traffic aircraft awareness in accordance with least one embodiment.

Referring to FIG. 1, a block diagram representation of a system 10 configured to provide situational traffic aircraft awareness in accordance with least one embodiment is shown. The system 10 may be utilized onboard a mobile platform 5, as described herein. In various embodiments, the mobile platform is an aircraft, which carries or is equipped with the system 10. As schematically depicted in FIG. 1, the system 10 includes the following components or subsystems, each of which may assume the form of a single device or multiple interconnected devices: a controller circuit 12 operationally coupled to: at least one display device 14; computer-readable storage media or memory 16; an optional input interface 18, and ownship data sources 20 including, for example, a flight management system (FMS) 21 and an array of flight system state and geospatial sensors 22.

In various embodiments, the system 10 may be separate from or integrated within: the flight management system (FMS) 21 and/or a flight control system (FCS). Although schematically illustrated in FIG. 1 as a single unit, the individual elements and components of the system 10 can be implemented in a distributed manner utilizing any practical number of physically distinct and operatively interconnected pieces of hardware or equipment. When the system 10 is utilized as described herein, the various components of the system 10 will typically all be located onboard the mobile platform 5.

The term "controller circuit" (and its simplification, "controller"), broadly encompasses those components utilized to carry-out or otherwise support the processing functionalities of the system 10. Accordingly, the controller circuit 12 can encompass or may be associated with a programmable logic array, application specific integrated circuit or other similar firmware, as well as any number of individual processors, flight control computers, navigational equipment pieces, computer-readable memories (including or in addition to the memory 16), power supplies, storage devices, interface cards, and other standardized components. In various embodiments, the controller circuit 12 embodies one or more processors operationally coupled to data storage having stored therein at least one firmware or software program (generally, computer-readable instructions that embody an algorithm) for carrying-out the various process tasks, calculations, and control/display functions described herein. During operation, the controller circuit 12 may be programmed with and execute the at least one firmware or software program, for example, a program 30, that embodies an algorithm described herein for providing situational traffic aircraft awareness in accordance with least one embodiment on a mobile platform 5, where the mobile platform 5 is an aircraft, and to accordingly perform the various process steps, tasks, calculations, and control/display functions described herein.

The controller circuit 12 may exchange data, including real-time wireless data, with one or more external sources 50 to support operation of the system 10 in embodiments. In this case, bidirectional wireless data exchange may occur over a communications network, such as a public or private network implemented in accordance with Transmission Control Protocol/Internet Protocol architectures or other conventional protocol standards. Encryption and mutual authentication techniques may be applied, as appropriate, to ensure data security.

The memory 16 is a data storage that can encompass any number and type of storage media suitable for storing computer-readable code or instructions, such as the aforementioned software program 30, as well as other data generally supporting the operation of the system 10. The memory 16 may also store one or more threshold 34 values, for use by an algorithm embodied in software program 30. One or more database(s) 28 are another form of storage media; they may be integrated with memory 16 or separate from it.

In various embodiments, aircraft-specific parameters and information for an aircraft may be stored in the memory 16 or in a database 28 and referenced by the program 30. Non-limiting examples of aircraft-specific information includes an aircraft weight and dimensions, performance capabilities, configuration options, and the like.

Flight parameter sensors and geospatial sensors 22 supply various types of data or measurements to the controller circuit 12 during an aircraft flight. In various embodiments, the geospatial sensors 22 supply, without limitation, one or more of: inertial reference system measurements providing a location, Flight Path Angle (FPA) measurements, airspeed data, groundspeed data (including groundspeed direction), vertical speed data, vertical acceleration data, altitude data, attitude data including pitch data and roll measurements, yaw data, heading information, sensed atmospheric conditions data (including wind speed and direction data), flight path data, flight track data, radar altitude data, and geometric altitude data.

With continued reference to FIG. 1, the display device 14 can include any number and type of image generating devices on which one or more avionic displays 32 may be produced. When the system 10 is utilized for a manned aircraft, the display device 14 may be affixed to the static structure of the Aircraft cockpit as, for example, a Head Down Display (HDD) or Head Up Display (HUD) unit. In various embodiments, the display device 14 may assume the form of a movable display device (e.g., a pilot-worn display device) or a portable display device, such as an Electronic Flight Bag (EFB), a laptop, or a tablet computer carried into the aircraft cockpit by a pilot.

At least one avionic display 32 is generated on the display device 14 during operation of the system 10; the term "avionic display" is synonymous with the term "aircraft-related display" and "cockpit display" and encompasses displays generated in textual, graphical, cartographical, and other formats. The system 10 can generate various types of lateral and vertical avionic displays 32 on which map views and symbology, text annunciations, and other graphics pertaining to flight planning are presented for a pilot to view. The display device 14 is configured to continuously render at least a lateral display showing the aircraft at its current location within the map data. The avionic display 32 generated and controlled by the system 10 can include graphical user interface (GUI) objects and alphanumerical input displays of the type commonly presented on the screens of multifunction control display units (MCDUs), as well as Control Display Units (CDUs) generally. Specifically, embodiments of the avionic displays 32 include one or more two-dimensional (2D) avionic displays, such as a horizontal (i.e., lateral) navigation display or vertical navigation display (i.e., vertical situation display VSD); and/or on one or more three dimensional (3D) avionic displays, such as a Primary Flight Display (PFD) or an exocentric 3D avionic display.

In various embodiments, a human-machine interface is implemented as an integration of a pilot input interface 18 and a display device 14. In various embodiments, the display device 14 is a touch screen display. In various embodiments, the human-machine interface also includes a separate pilot input interface 18 (such as a keyboard, cursor control device, voice input device, or the like), generally operationally coupled to the display device 14. Via various display and graphics systems processes, the controller circuit 12 may command and control a touch screen display device 14 to generate a variety of graphical user interface (GUI) objects or elements described herein, including, for example, buttons, sliders, and the like, which are used to prompt a user to interact with the human-machine interface to provide user input; and for the controller circuit 12 to activate respective functions and provide user feedback, responsive to received user input at the GUI element.

In various embodiments, the system 10 may also include a dedicated communications circuit 24 configured to provide a real-time bidirectional wired and/or wireless data exchange for the controller 12 to communicate with the external sources 50 (including, each of: traffic, air traffic control (ATC), satellite weather sources, ground stations, and the like). In various embodiments, the communications circuit 24 may include a public or private network implemented in accordance with Transmission Control Protocol/Internet Protocol architectures and/or other conventional protocol standards. Encryption and mutual authentication techniques may be applied, as appropriate, to ensure data security. In some embodiments, the communications circuit 24 is integrated within the controller circuit 12, and in other embodiments, the communications circuit 24 is external to the controller circuit 12. When the external source 50 is "traffic," the communications circuit 24 may incorporate software and/or hardware for communication protocols as needed for traffic collision avoidance (TCAS), automatic dependent surveillance-broadcast (ADS-B), and enhanced vision systems (EVS).

In certain embodiments of the system 10, the controller circuit 12 and the other components of the system 10 may be integrated within or cooperate with any number and type of systems commonly deployed onboard an aircraft including, for example, an FMS 21.

The disclosed algorithm is embodied in a hardware program or software program (e.g. program 30 in controller circuit 12) and configured to operate when the aircraft is in any phase of flight. In various embodiments, the provided controller circuit 12, and therefore its program 30 may incorporate the programming instructions for: receiving an aircraft location of the aircraft from at least one geospatial sensor of the aircraft; receiving traffic aircraft data including an aircraft identifier and a traffic aircraft location for each of a plurality of traffic aircraft from Automatic Dependent Surveillance-Broadcast (ADS-B); generating a traffic aircraft display based on the aircraft location and the traffic aircraft data for display on a first display device on the aircraft, wherein the traffic aircraft display comprises a graphical representation of the aircraft at the aircraft location, graphical representations of each of the plurality of traffic aircraft at the associated traffic aircraft locations, and a selectable preview element; receiving a plurality of clearance messages, wherein each of the plurality of clearance messages is associated with one of the plurality of traffic aircraft and comprises the aircraft identifier, a time stamp, and clearance data associated with the one of the plurality of traffic aircraft; storing the aircraft identifier in association with the clearance data and the time stamp for each of the plurality of traffic aircraft in a traffic aircraft clearance table; receiving a selection of the graphical representation of a first traffic aircraft from the traffic aircraft display, the first traffic aircraft having a first aircraft identifier and a selection of the preview element; retrieving first clearance data corresponding to the first aircraft identifier having a first time-stamp and second clearance data corresponding to the first aircraft having a second time-stamp from the traffic clearance table responsive to the selection of the preview element, wherein the second time-stamp is prior to the first-time stamp; and regenerating the traffic aircraft display to include the first and second clearance data as a first tag associated with the graphical representation of the first traffic aircraft.

Figure 2:
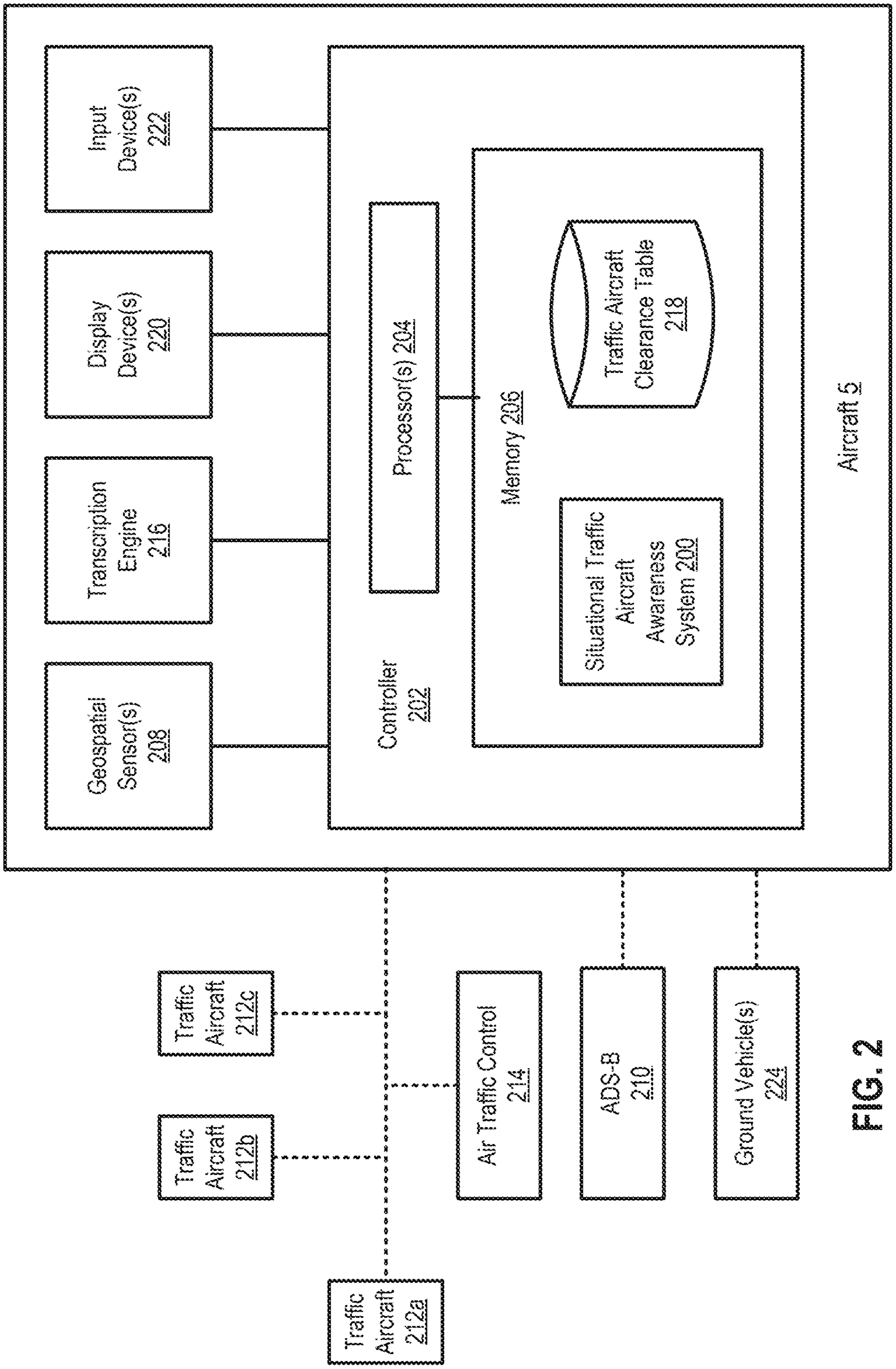
FIG. 2 is a block diagram representation of an aircraft including a situational traffic aircraft awareness system in accordance with at least one embodiment.

Referring FIG. 2, a block diagram representation of an aircraft 5 including a situational traffic aircraft awareness system 200 in accordance with at least one embodiment is shown. The aircraft 5 includes a controller 202. The controller 202 includes at least one processor 204 and at least one memory 206. The at least one memory 206 includes the situational traffic aircraft awareness system 200. In various embodiments, the controller 202 may include additional components that facilitate operation of the controller 202.

The controller 202 is configured to be communicatively coupled to one or more geospatial sensors 208. In at least one embodiment, the geospatial sensor(s) 208 are similar to the geospatial sensors 22 described with reference to FIG. 1. The situational traffic aircraft awareness system 200 is configured to receive aircraft locations of the aircraft 5 from the geospatial sensor(s) 208.

The controller 202 is configured to be communicatively coupled to an Automatic Dependent Surveillance-Broadcast (ADS-B) 210. The situational traffic aircraft awareness system 200 is configured to receive traffic aircraft data for traffic aircraft 212*a*, 212*b*, 212*c* within a vicinity of the aircraft 5 from the ADS-B 210. The traffic aircraft data for each traffic aircraft 212*a*, 212*b*, 212*c* includes an aircraft identifier and a traffic aircraft location for the traffic aircraft 212*a*, 212*b*, 212*c*.

The controller 202 is configured to be communicatively coupled to air traffic control (ATC) 214 via an ATC communication frequency. The situational traffic aircraft awareness system 200 is configured to receive clearance messages for the aircraft 5 received from ATC 214 via the ATC communication frequency. The traffic aircraft 212*a*, 212*b*, 212*c* are configured to communicate with ATC 214 via the ATC communication frequency. The situational traffic aircraft awareness system 200 is configured to receive clearance messages transmitted by ATC 214 to the traffic aircraft 212*a*, 212*b*, 212*c* via the ATC communication frequency. Each clearance message associated with a traffic aircraft 212*a*, 212*b*, 212*c* includes the aircraft identifier, a time stamp, and clearance data.

The controller 202 is configured to be communicatively coupled to a common traffic advisory frequency (CTAF). The traffic aircraft 212*a*, 212*b*, 212*c* and the aircraft 5 communicate with each other via the CTAF in non-towered airport locations. The traffic aircraft 212*a*, 212*b*, 212*c* and the aircraft 5 are configured to transmit clearance messages via the CTAF. The situational traffic aircraft awareness system 200 is configured to receive clearance messages transmitted by the traffic aircraft 212*a*, 212*b*, 212*c* via the CTAF. Each clearance message associated with a traffic aircraft 212*a*, 212*b*, 212*c* includes the aircraft identifier, a time stamp, and clearance data.

The controller 202 is configured to be communicatively coupled to a transcription engine 216. The transcription engine 216 is configured receive the clearance messages from the situational traffic aircraft awareness system 200 and transcribe the clearance messages to generated transcribed clearance messages. The transcription engine 216 is configured to transmit the transcribed clearance messages to the situational traffic aircraft awareness system 200. While the transcription engine 216 is illustrated as being separate from the situational traffic aircraft awareness system 200, in alternative embodiments, the transcription engine 216 may be a component of the situational traffic aircraft awareness system 200.

The at least one memory 206 includes a traffic aircraft clearance table 218. The situational traffic aircraft awareness system 200 is configured to be communicatively coupled to the traffic aircraft clearance table 218. When the situational traffic aircraft awareness system 200 receives a clearance message associated with a traffic aircraft 212*a*, 212*b*, 212*c*, the situational traffic aircraft awareness system 200 is configured to store the aircraft identifier for that traffic aircraft 212*a*, 212*b*, 212*c* in association with the clearance data and the time stamp received in the clearance message in the traffic aircraft clearance table 218.

The controller 202 is configured to be communicatively coupled to one or more display devices 220. The display device(s) 220 are configured to display displays generated by the situational traffic aircraft awareness system 200. In at least one embodiment, the display device(s) 220 are similar to the display devices 14 described with reference to FIG. 1. The controller 202 is configured to be communicatively coupled to one or more input devices 222. The situational traffic aircraft awareness system 200 is configured to receive user inputs via the input device(s) 222. In at least one embodiment, the input device(s) are similar to the input devices 18 described with reference to FIG. 1.

In at least one embodiment, the controller 202 is configured to be communicatively coupled to one or more ground vehicles 224 within a vicinity of the aircraft 5. The situational traffic aircraft awareness system 200 is configured to receive clearance messages associated with the ground vehicle(s) 224 from the ground vehicle(s) 224. In at least one embodiment, the situational traffic aircraft awareness system 200 is configured to receive the clearance messages associated with the ground vehicle(s) 224 from ATC 214 via the ATC communication frequency.

In various embodiments, the controller 202 may include additional components that facilitate operation of the situational traffic aircraft awareness system 200. The operation of the situational traffic aircraft awareness system 200 will be described in greater detail below.

Figure 3:
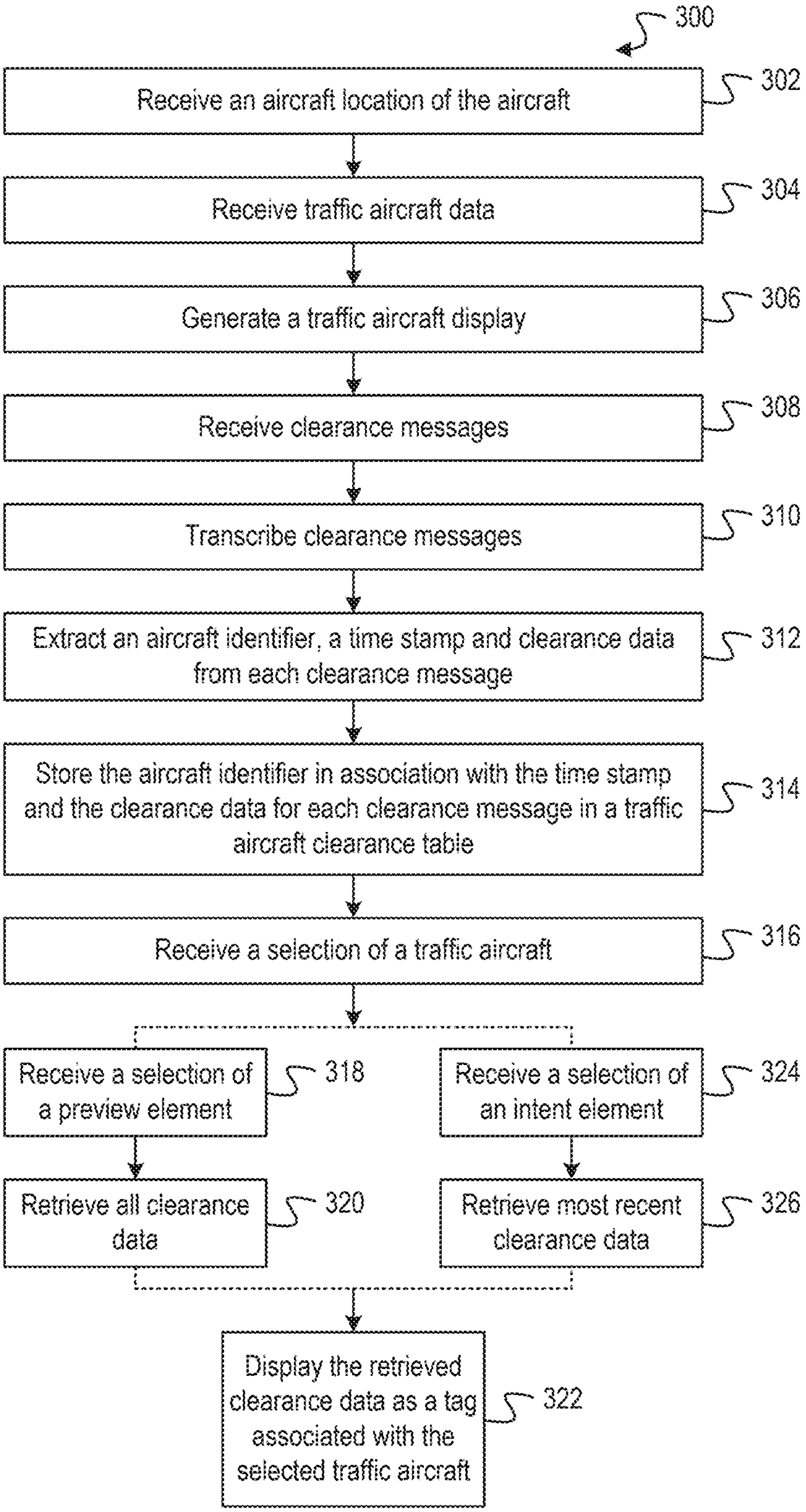
FIG. 3 is a flowchart representation of a method for providing situational traffic aircraft awareness onboard an aircraft in accordance with at least one embodiment.

Referring to FIG. 3, a flowchart representation of a method 300 for providing situational traffic aircraft awareness onboard an aircraft 5 in accordance with at least one embodiment is shown. The method 300 will be described with reference to an exemplary implementation of a situational traffic aircraft awareness system 200. As can be appreciated in light of the disclosure, the order of operation within the method 300 is not limited to the sequential execution as illustrated in FIG. 3 but may be performed in one or more varying orders as applicable and in accordance with the present disclosure.

At 302, the situational traffic aircraft awareness system 200 receives an aircraft location of an aircraft 5 from a geospatial sensor 208 of the aircraft 5. At 304, the situational traffic aircraft awareness system 200 receives traffic aircraft data for traffic aircraft 212*a*, 212*b*, 212*c* within a vicinity of the aircraft 5 from ADS-B 210. The traffic aircraft data associated with each traffic aircraft 212*a*, 212*b*, 212*c* includes an aircraft identifier and traffic aircraft location for the traffic aircraft 212*a*, 212*b*, 212*c*.

At 306, the situational traffic aircraft awareness system 200 generates a traffic aircraft display for display on a display device 220 of the aircraft 5. The traffic aircraft display is generated based on the aircraft location of the aircraft 5 and the traffic aircraft data associated with the traffic aircraft 212*a*, 212*b*, 212*c*. The traffic aircraft display includes a graphical representation of the aircraft 5 at the aircraft location and graphical representations of each of the traffic aircraft 212*a*, 212*b*, 212*c* at the corresponding traffic aircraft locations. The traffic aircraft display includes a selectable preview element and a selectable intent element.

Figure 4:
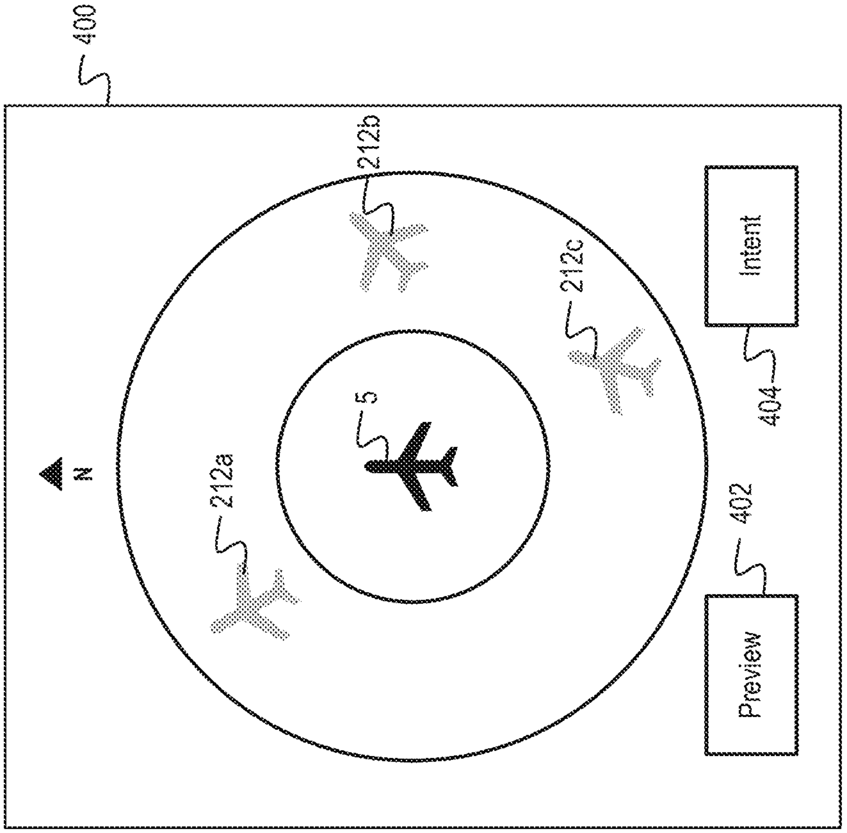
FIG. 4 is an exemplary illustration of a traffic aircraft display in accordance with at least one embodiment.

Referring to FIG. 4, an exemplary illustration of a traffic aircraft display 400 in accordance with at least one embodiment is shown. The traffic aircraft display 400 is a navigation display that includes a graphical representation of an aircraft 5 at the aircraft location and graphical representations of each of the traffic aircraft 212*a*, 212*b*, 212*c* at the corresponding traffic aircraft locations. The traffic aircraft display 400 includes a selectable preview element 402 and a selectable intent element 404.

Referring back to FIG. 3, at 308, the situational traffic aircraft awareness system 200 receives clearance messages. At a towered airport, the situational traffic aircraft awareness system 200 is communicatively coupled to ATC 214 via an ATC communication frequency. The situational traffic aircraft awareness system 200 receives clearance messages transmitted by ATC 214 to the aircraft 5 and clearance messages transmitted by ATC 214 to the traffic aircraft 212*a*, 212*b*, 212*c* via the ATC communication frequency. Each clearance message associated with a traffic aircraft 212*a*, 212*b*, 212*c* includes the aircraft identifier, a time stamp, and clearance data.

At a non-towered airport, the situational traffic aircraft awareness system 200 is communicatively coupled to CTAF. The traffic aircraft 212*a*, 212*b*, 212*c* and the aircraft 5 communicate with each other via the CTAF. The traffic aircraft 212*a*, 212*b*, 212*c* and the aircraft 5 transmit clearance messages via the CTAF. The situational traffic aircraft awareness system 200 receives the clearance messages transmitted by the traffic aircraft 212*a*, 212*b*, 212*c* via the CTAF. Each clearance message associated with a traffic aircraft 212*a*, 212*b*, 212*c* includes the aircraft identifier, a time stamp, and clearance data.

In at least one embodiment, the situational traffic aircraft awareness system 200 receives ground clearance messages from ground vehicles. Each ground clearance message is associated with a ground vehicle and includes a ground vehicle identifier, a ground clearance message time stamp, and ground clearance data associated with the ground vehicle.

At 310, the clearance messages are transcribed by a transcription engine 216 to generate transcribed clearance messages. At 312, the situational traffic aircraft awareness system 200 extracts the aircraft identifier, the time stamp, and the clearance data from each of the transcribed clearance messages. At 314, the situational traffic aircraft awareness system 200 stores the aircraft identifier in association with the time stamp and the clearance data for each of the clearance messages in a traffic aircraft clearance table 218.

At 316, the situational traffic aircraft awareness system 200 receives a selection of a traffic aircraft 212*a*, 212*b*, 212*c* displayed on the traffic aircraft display by a user via an input device 222. The traffic aircraft display includes the selectable preview element and the selectable intent element. The user is provided with the option of selecting one of the selectable preview element and the selectable intent element from the traffic aircraft display 400 via the input device 222.

If the situational traffic aircraft awareness system 200 receives a selection of the preview element from the traffic aircraft display via the input device 222 at 318, the situational traffic aircraft awareness system 200 retrieves all of the clearance data associated with the selected traffic aircraft 212*a*, 212*b*, 212*c* from the traffic aircraft clearance table 218 at 320. The situational traffic aircraft awareness system 200 uses the aircraft identifier associated with the selected traffic aircraft to identify all of the clearance data associated with the selected traffic aircraft in the traffic aircraft clearance table 218 and retrieves the identified clearance data.

At 322, the situational traffic aircraft awareness system 200 displays the retrieved clearance data as a tag in association with the selected traffic aircraft on the traffic aircraft display on the display device 220. The situational traffic aircraft awareness system 200 regenerates the traffic aircraft display to include the retrieved clearance data as a tag in association with the graphical representation of the selected traffic aircraft on the traffic aircraft display.

Figure 5:
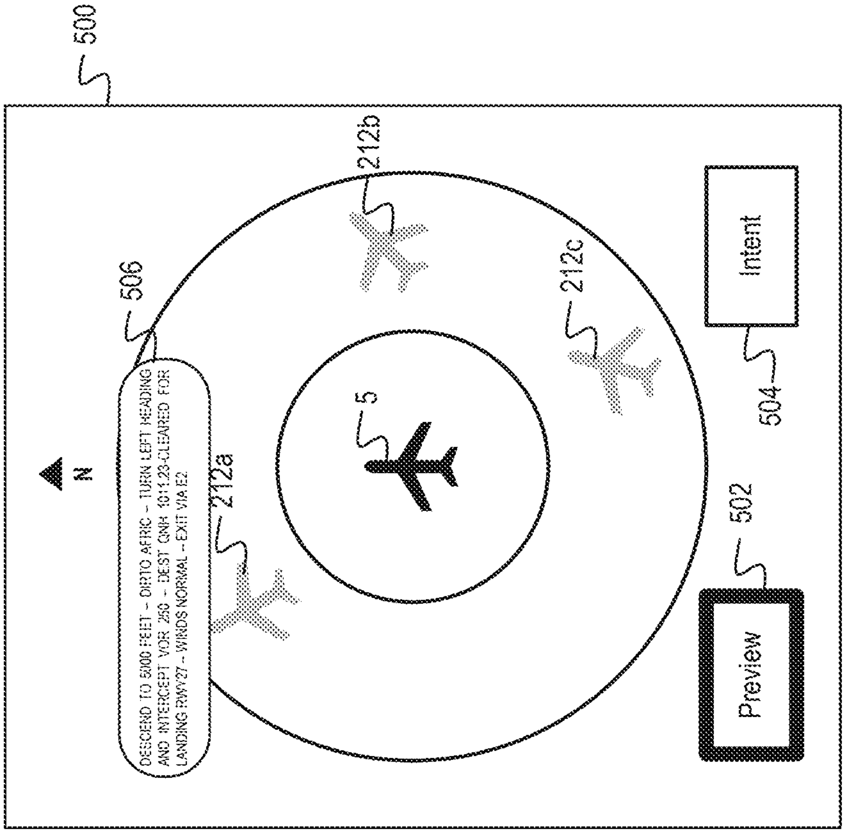
FIG. 5 is an exemplary illustration of a traffic aircraft display generated in response to selection of a selected traffic aircraft and a preview element in accordance with at least one embodiment.

Referring to FIG. 5, an exemplary illustration of a traffic aircraft display 500 generated in response to selection of a selected traffic aircraft 212*a* and a preview element 502 in accordance with at least one embodiment is shown. The traffic aircraft display 500 is a navigation display that includes a graphical representation of an aircraft 5 at the aircraft location and graphical representations of each of the traffic aircraft 212*a*, 212*b*, 212*c* at the corresponding traffic aircraft locations. The traffic aircraft display 500 includes a selectable preview element 502 and a selectable intent element 504.

The situational traffic aircraft awareness system 200 received a selection of the traffic aircraft 212*a* from the traffic aircraft display 500 and a selection of the preview element 502 from the traffic aircraft display 500 via the input device 222. The situational traffic aircraft awareness system 200 used the aircraft identifier associated with the selected traffic aircraft 212*a* to identify and retrieve all of the clearance data associated with the selected traffic aircraft 212*a* in the traffic aircraft clearance table 218.

The situational traffic aircraft awareness system 200 regenerated the traffic aircraft display 500 to include the retrieved clearance data as a tag 506 in association with the graphical representation of the selected traffic aircraft 212*a* on the traffic aircraft display 500. The retrieved clearance data associated with the selected traffic aircraft 212*a* are "DESCEND TO 5000 FEET", "DIRTO AFRIC", "TURN LEFT HEADING AND INTERCEPT VOR 250", "DEST QNH 1011.23-CLEARED FOR LANDING RWY27", "WINDS NORMAL" and "EXIT VIA E2." Each clearance data is associated with a time stamp. The clearance data is displayed in chronological order within the tag 506 with the clearance data with the oldest timestamp being displayed first and the clearance data with the more recent timestamp being displayed last. The displayed clearance data associated with the selected traffic aircraft 212*a* enables a crew of the aircraft 5 to preview an arrival trend based on the clearance data issued to the selected traffic aircraft 212*a* by the ATC 214.

Referring back to FIG. 3, if the situational traffic aircraft awareness system 200 receives a selection of the intent element from the from the traffic aircraft display via the input device 222 at 324, the situational traffic aircraft awareness system 200 retrieves the most recent clearance data associated with the selected traffic aircraft 212*a*, 212*b*, 212*c* from the traffic aircraft clearance table 218 at 326. The situational traffic aircraft awareness system 200 uses the aircraft identifier associated with the selected traffic aircraft to identify the most recent clearance data associated with the selected traffic aircraft in the traffic aircraft clearance table 218 and retrieves the identified clearance data.

At 322, the situational traffic aircraft awareness system 200 displays the retrieved clearance data as a tag in association with the selected traffic aircraft on the traffic aircraft display on the display device 220. The situational traffic aircraft awareness system 200 regenerates the traffic aircraft display to include the retrieved clearance data as a tag in association with the graphical representation of the selected traffic aircraft on the traffic aircraft display.

Figure 6:
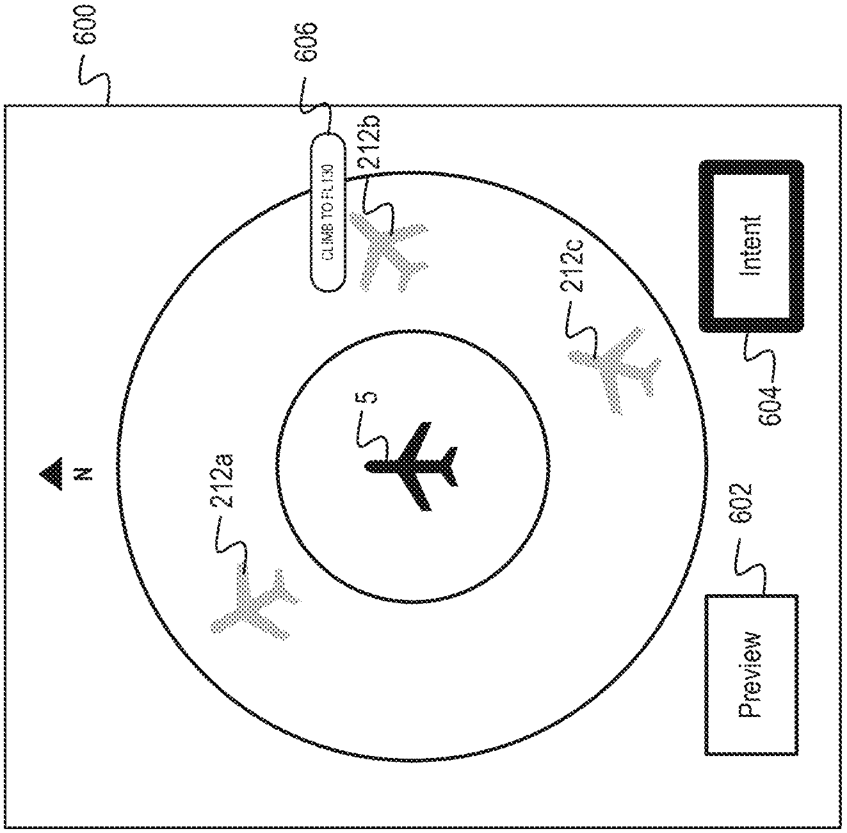
FIG. 6 is an exemplary illustration of a traffic aircraft display generated in response to selection of a selected traffic aircraft and an intent element in accordance with at least one embodiment.

Referring to FIG. 6, an exemplary illustration of a traffic aircraft display 600 generated in response to selection of a selected traffic aircraft 212*b* and an intent element 604 in accordance with at least one embodiment is shown. The traffic aircraft display 600 is a navigation display that includes a graphical representation of an aircraft 5 at the aircraft location and graphical representations of each of the traffic aircraft 212*a*, 212*b*, 212*c* at the corresponding traffic aircraft locations. The traffic aircraft display 600 includes a selectable preview element 602 and a selectable intent element 604.

The situational traffic aircraft awareness system 200 received a selection of the traffic aircraft 212*b* from the traffic aircraft display 600 and a selection of the intent element 604 from the traffic aircraft display 600 via the input device 222. The situational traffic aircraft awareness system 200 used the aircraft identifier associated with the selected traffic aircraft 212*b* to identify and retrieve the most recent clearance data associated with the selected traffic aircraft 212*b* in the traffic aircraft clearance table 218.

The situational traffic aircraft awareness system 200 regenerated the traffic aircraft display 600 to include the retrieved clearance data as a tag 606 in association with the graphical representation of the selected traffic aircraft 212*b* on the traffic aircraft display 600. The retrieved most recent clearance data associated with the selected traffic aircraft 212*b* is "CLIMB TO FL130." The most recent clearance data associated with the selected traffic aircraft 212*b* enables a crew of the aircraft 5 to preview an intent of the selected traffic aircraft 212*b* based on the most recent clearance data issued to the selected traffic aircraft 212*b* by ATC 214.

In an alternative embodiment, if the situational traffic aircraft awareness system 200 receives a selection of the intent element from the traffic aircraft display via the input device 222, the situational traffic aircraft awareness system 200 determines if clearance data associated with one or more of the traffic aircraft 212*a*, 212*b*, 212*c* is available. The situational traffic aircraft awareness system 200 uses the aircraft identifier associated with the traffic aircraft 212*a*, 212*b*, 212*c* determine if clearance data associated with one or more of the traffic aircraft 212*a*, 212*b*, 212*c* is available in the traffic aircraft clearance table 218.

If the situational traffic aircraft awareness system 200 determines that clearance data associated with one or more of the traffic aircraft 212*a*, 212*b*, 212*c* is available in the traffic aircraft clearance table 218, the situational traffic aircraft awareness system 200 retrieves the most recent clearance data associated with the one or more of the traffic aircraft 212*a*, 212*b*, 212*c*. The situational traffic aircraft awareness system 200 displays the retrieved clearance data as a tag in association with the one or more of the traffic aircraft 212*a*, 212*b*, 212*c* on the traffic aircraft display on the display device 220. The situational traffic aircraft awareness system 200 regenerates the traffic aircraft display to include the retrieved clearance data as tags in association with the graphical representations of the one or more traffic aircraft 212*a*, 212*b*, 212*c* on the traffic aircraft display.

Figure 7:
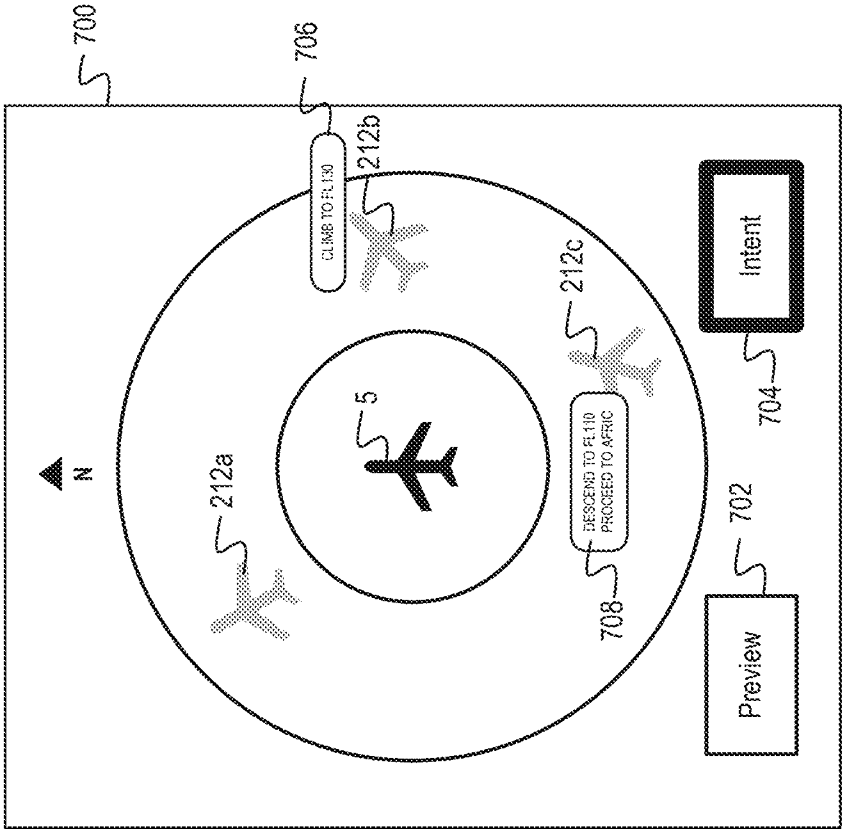
FIG. 7 is an exemplary illustration of a traffic aircraft display generated in response to selection of an intent element in accordance with at least one embodiment.

Referring to FIG. 7, an exemplary illustration of a traffic aircraft display 700 generated in response to selection of an intent element 704 in accordance with at least one embodiment is shown. The traffic aircraft display 700 is a navigation display that includes a graphical representation of an aircraft 5 at the aircraft location and graphical representations of each of the traffic aircraft 212*a*, 212*b*, 212*c* at the corresponding traffic aircraft locations. The traffic aircraft display 700 includes a selectable preview element 702 and a selectable intent element 704.

The situational traffic aircraft awareness system 200 received a selection of the intent element 704 from the traffic aircraft display 700 via the input device 222. The situational traffic aircraft awareness system 200 used the aircraft identifiers associated with each of the traffic aircraft 212*a*, 212*b*, 212*c* to determine if clearance data associated with one or more of the traffic aircraft 212*a*, 212*b*, 212*c* is available in the traffic aircraft clearance table 218. The situational traffic aircraft awareness system 200 determined that clearance data associated with the traffic aircraft 212*b* and the traffic aircraft 212*c* were available in the traffic aircraft clearance table 218. The situational traffic aircraft awareness system 200 retrieved the most recent clearance data associated with the traffic aircraft 212*b* and the traffic aircraft 212*c*.

The situational traffic aircraft awareness system 200 regenerated the traffic aircraft display 700 to include the retrieved clearance data for the traffic aircraft 212*b* as a tag 706 in association with the graphical representation of the traffic aircraft 212*b* on the traffic aircraft display 700. The most recent clearance data associated with the traffic aircraft 212*b* is "CLIMB TO FL130."

The situational traffic aircraft awareness system 200 regenerated the traffic aircraft display 700 to include the retrieved clearance data for the traffic aircraft 212*c* as a tag 708 in association with the graphical representations of the traffic aircraft 212*c* on the traffic aircraft display 700. The most recent clearance data associated with the traffic aircraft 212*c* is "DESCEND TO FL110 PROCEED TO AFRIC."

In at least one embodiment, the controller 200 is configured to be communicatively coupled to a portable device. The portable device is configured to display a pilot ATC chat window display. The situational traffic aircraft awareness system 200 is configured to receive clearance messages associated with the aircraft 5 and the traffic aircraft 212*a*, 212*b*, 212*c*. The situational traffic aircraft awareness system 200 is configured to use a transcription engine 216 to generate transcribed clearance messages. The situational traffic aircraft awareness system 200 is configured to extract an aircraft identifier and clearance data from each transcribed clearance message. The situational traffic aircraft awareness system 200 is configured to transmit the extracted aircraft identifier and clearance data to the portable device.

When the pilot ATC chat window display is placed in chat view, the aircraft identifier and clearance data for each clearance message is displayed as a chat entry in the pilot ATC chat window display. Upon selection of a chat entry associated with a traffic aircraft 212*a*, 212*b*, 212*c* from the pilot ATC chat window display by a user via the input device 222, the situational traffic aircraft awareness system 200 is configured to responsively display a selectable locate element adjacent the selected chat entry.

Upon selection of the locate element by the user via the input device 222, the pilot ATC chat window display is placed in traffic view and the situational traffic aircraft awareness system 200 is configured to transmit an aircraft location of the aircraft 5 and traffic aircraft locations of each of the traffic aircraft 212*a*, 212*b*, 212*c* to the portable device for display on the pilot ATC chat window display in the traffic view.

A graphical symbol representation of a traffic aircraft location associated with the aircraft identifier of the traffic aircraft 212*a*, 212*b*, 212*c* associated with the selected chat entry is presented using a first format. In at least one embodiment, the first format is a highlighted format. The clearance data in the selected chat entry is displayed as a tag in association with the graphical symbol representation of the traffic aircraft location associated with the aircraft identifier of the traffic aircraft 212*a*, 212*b*, 212*c* associated with the selected chat entry. Graphical symbol representations of the traffic aircraft locations of the other traffic aircraft 212*a*, 212*b*, 212*c*, are presented using a second format. The graphical symbol representation of the aircraft location of the aircraft 5 is presented using a third format.

The pilot ATC chat window display in traffic view renders the traffic aircraft locations of the traffic aircraft 212*a*, 212*b*, 212*c*, with respect to the aircraft location of the aircraft 5 when in traffic view and provides a visual representation of the traffic aircraft locations as well as the clearance data associated with the selected chat entry.

Figure 8:
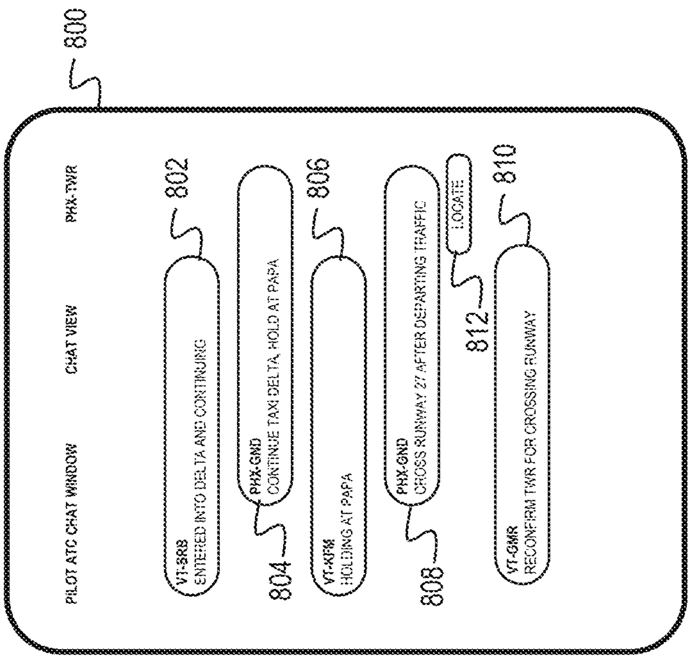
FIG. 8 is an exemplary illustration of a chat view of a pilot air traffic control (ATC) chat window display in accordance with at least one embodiment.

Referring to FIG. 8, an exemplary illustration of a chat view of a pilot ATC chat window display 800 in accordance with at least one embodiment is shown. The pilot ATC chat window display 800 includes a plurality of chat entries 802, 804, 806, 808, 810. Each chat entry 802, 804, 806, 808, 810 includes an aircraft identifier and clearance data associated with a clearance message. The chat entry 808 has been selected by a user via an input device 222. The selected chat entry 808 includes the aircraft idenfier PHX-GND and the clearance data "CROSS RUNWAY 27 AFTER DEPARTING TRAFFIC." The situational traffic aircraft awareness system 200 has responsively displayed a selectable locate element 812 adjacent the selected chat entry 808.

Figure 9:
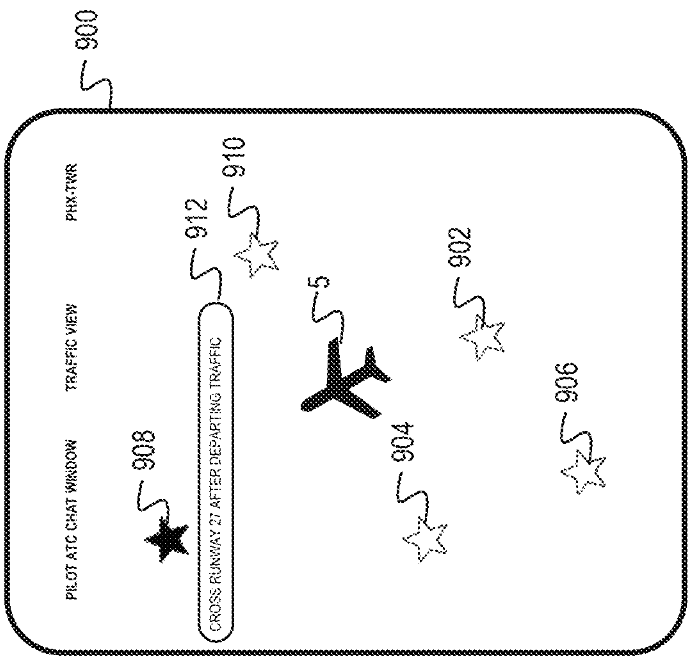
FIG. 9 is an exemplary illustration of a traffic view of a pilot ATC chat window display in accordance with at least one embodiment.

Upon selection of the locate element 812 by the user via the input device 222, the pilot ATC chat window display 800 is placed in traffic view. Referring to FIG. 9, an exemplary illustration of a traffic view of a pilot ATC chat window display 900 in accordance with at least one embodiment is shown. The situational traffic aircraft awareness system 200 transmitted an aircraft location of the aircraft 5 and traffic aircraft locations of each of the traffic aircraft to the portable device for display on the pilot ATC chat window display 900 in the traffic view in response to the selection of the locate element 812.

A graphical symbol representation of a traffic aircraft location 908 associated with the aircraft identifier of the traffic aircraft associated with the selected chat entry 808 is presented using a first format. The clearance data "CROSS RUNWAY 27 AFTER DEPARTING TRAFFIC" in the selected chat entry 808 is displayed as a tag 912 in association with the graphical symbol representation of the traffic aircraft location 908. Graphical symbol representations of the traffic aircraft locations 902, 904, 906, 910 of the other traffic aircraft are presented using a second format. The graphical symbol representation of the aircraft location of the aircraft 5 is presented using a third format.

Those of skill in the art will appreciate that the various illustrative logical blocks, modules, circuits, and algorithm steps described in connection with the embodiments disclosed herein may be implemented as electronic hardware, computer software, or combinations of both.

Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "computer-readable medium", "processor-readable medium", or "machine-readable medium" may include any medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like.

Some of the functional units described in this specification have been referred to as "modules" in order to more particularly emphasize their implementation independence. For example, functionality referred to herein as a module may be implemented wholly, or partially, as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like. Modules may also be implemented in software for execution by various types of processors. An identified module of executable code may, for instance, comprise one or more physical or logical modules of computer instructions that may, for instance, be organized as an object, procedure, or function. Nevertheless, the executables of an identified module need not be physically located together, but may comprise disparate instructions stored in different locations that, when joined logically together, comprise the module and achieve the stated purpose for the module. Indeed, a module of executable code may be a single instruction, or many instructions, and may even be distributed over several different code segments, among different programs, and across several memory devices. Similarly, operational data may be embodied in any suitable form and organized within any suitable type of data structure. The operational data may be collected as a single data set, or may be distributed over different locations including over different storage devices, and may exist, at least partially, merely as electronic signals on a system or network.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A method for providing situational traffic aircraft awareness in an aircraft comprising:

receiving, at a controller, an aircraft location of the aircraft from at least one geospatial sensor of the aircraft;

receiving, at the controller, traffic aircraft data including an aircraft identifier and a traffic aircraft location for each of a plurality of traffic aircraft from Automatic Dependent Surveillance-Broadcast (ADS-B);

generating, by the controller, a traffic aircraft display based on the aircraft location and the traffic aircraft data for display on a first display device on the aircraft, wherein the traffic aircraft display comprises a graphical representation of the aircraft at the aircraft location, graphical representations of each of the plurality of traffic aircraft at the associated traffic aircraft locations, and a selectable preview element;

receiving, at the controller, a plurality of clearance messages, wherein each of the plurality of clearance messages is associated with one of the plurality of traffic aircraft and comprises the aircraft identifier, a time stamp, and clearance data associated with the one of the plurality of traffic aircraft;

storing, by the controller, the aircraft identifier in association with the clearance data and the time stamp for each of the plurality of traffic aircraft in a traffic aircraft clearance table;

receiving, at the controller, a selection of the graphical representation of a first traffic aircraft from the traffic aircraft display, the first traffic aircraft having a first aircraft identifier and a selection of the preview element;

retrieving, by the controller, first clearance data corresponding to the first aircraft identifier having a first time-stamp and second clearance data corresponding to the first aircraft having a second time-stamp from the traffic clearance table responsive to the selection of the preview element, wherein the second time-stamp is prior to the first-time stamp; and regenerating, by the controller, the traffic aircraft display to include the first and second clearance data as a first tag associated with the graphical representation of the first traffic aircraft.

2. The method of claim 1, further comprising receiving, by the controller, the plurality of clearance messages from a common traffic advisory frequency (CTAF).

3. The method of claim 1, further comprising receiving, by the controller, the plurality of clearance messages from an air traffic control (ATC) communication frequency.

4. The method of claim 1, further comprising:

generating, by the controller, the traffic aircraft display to include a selectable intent element;

receiving, at the controller, a selection of the intent element;

identifying, by the controller, most recent clearance data corresponding to the first aircraft identifier in the aircraft traffic clearance table responsive to selection of the intent element; and regenerating, by the controller, the traffic aircraft display to include the most recent clearance data as a second tag associated with the graphical representation of the first traffic aircraft.

5. The method of claim 1, further comprising:

transcribing, by the controller, the plurality of clearance messages using a transcription engine to generate a plurality of transcribed clearance messages; and extracting, by the controller, the clearance data associated with each of the plurality of traffic aircraft from the transcribed clearance messages.

6. The method of claim 5, further comprising:

generating, by the controller, a pilot ATC chat window in chat view comprising a plurality of chat entries for display on a portable device on the aircraft, each of the chat entries being associated with one of the plurality of traffic aircraft and comprising the traffic aircraft identifier and clearance data associated with the one of the plurality of traffic aircraft;

receiving, at the controller, a selection of one of the plurality of chat entries;

responsively generating, by the controller, a selectable locate element associated with the selected one of the plurality of chat entries;

receiving, at the controller, a selection of the locate element; and generating, by the controller, the pilot ATC chat window in a chat view for display on the portable device responsive to the selection of the locate element, the traffic view comprising:

a graphical symbol representation of the aircraft at the aircraft location;

graphical symbol representations of the traffic aircraft at the associated traffic aircraft locations, wherein the graphical symbol representation of the traffic aircraft associated with the aircraft traffic identifier in the chat entry is a highlighted graphical symbol representation; and the clearance data is associated with the selected one of the plurality of traffic aircraft.

7. The method of claim 1, wherein receiving, at the controller, the plurality of clearance messages comprises receiving, at the controller, a plurality of ground clearance messages from a plurality of ground vehicles, wherein each of the plurality of ground clearance messages is associated with a ground vehicle and comprises a ground vehicle identifier, a ground clearance message time stamp, and ground clearance data associated with the one of the plurality of ground vehicles.

8. A situational traffic aircraft awareness system comprising:

at least one processor; and at least one memory communicatively coupled to the at least one processor, the at least one memory comprising instructions that, upon execution by the at least one processor, cause the at least one processor to:

receive an aircraft location of the aircraft from at least one geospatial sensor of the aircraft;

receive traffic aircraft data including an aircraft identifier and a traffic aircraft location for each of a plurality of traffic aircraft from Automatic Dependent Surveillance-Broadcast (ADS-B);

generate a traffic aircraft display based on the aircraft location and the traffic aircraft data for display on a first display device on the aircraft, wherein the traffic aircraft display comprises a graphical representation of the aircraft at the aircraft location, graphical representations of each of the plurality of traffic aircraft at the associated traffic aircraft locations, and a selectable preview element;

receive a plurality of clearance messages, wherein each of the plurality of clearance messages is associated with one of the plurality of traffic aircraft and comprises the aircraft identifier, a time stamp, and clearance data associated with the one of the plurality of traffic aircraft;

store the aircraft identifier in association with the clearance data and the time stamp for each of the plurality of traffic aircraft in a traffic aircraft clearance table;

receive a selection of the graphical representation of a first traffic aircraft from the traffic aircraft display, the first traffic aircraft having a first aircraft identifier and a selection of the preview element;

retrieve first clearance data corresponding to the first aircraft identifier having a first time-stamp and second clearance data corresponding to the first aircraft having a second time-stamp from the traffic clearance table responsive to the selection of the preview element, wherein the second time-stamp is prior to the first-time stamp; and regenerate the traffic aircraft display to include the first and second clearance data as a first tag associated with the graphical representation of the first traffic aircraft.

9. The system of claim 8, wherein the at least one memory further comprises instructions that, upon execution by the at least one processor, cause the at least one processor to receive the plurality of clearance messages from a common traffic advisory frequency (CTAF).

10. The system of claim 8, wherein the at least one memory further comprises instructions that, upon execution by the at least one processor, cause the at least one processor to receive the plurality of clearance messages from an air traffic control (ATC) communication frequency.

11. The system of claim 8, wherein the at least one memory further comprises instructions that, upon execution by the at least one processor, cause the at least one processor to:

generate the traffic aircraft display to include a selectable intent element;

receive a selection of the intent element;

identify most recent clearance data corresponding to the first aircraft identifier in the aircraft traffic clearance table responsive to selection of the intent element; and regenerate the traffic aircraft display to include the most recent clearance data as a second tag associated with the graphical representation of the first traffic aircraft.

12. The system of claim 8, wherein the at least one memory further comprises instructions that, upon execution by the at least one processor, cause the at least one processor to:

transcribe the plurality of clearance messages using a transcription engine to generate a plurality of transcribed clearance messages; and extract the clearance data associated with each of the plurality of traffic aircraft from the transcribed clearance messages.

13. The system of claim 12, wherein the at least one memory further comprises instructions that, upon execution by the at least one processor, cause the at least one processor to:

generate a pilot ATC chat window in chat view comprising a plurality of chat entries for display on a portable device on the aircraft, each of the chat entries being associated with one of the plurality of traffic aircraft and comprising the traffic aircraft identifier and clearance data associated with the one of the plurality of traffic aircraft;

receive a selection of one of the plurality of chat entries;

responsively generate a selectable locate element associated with the selected one of the plurality of chat entries;

receive a selection of the locate element; and generate the pilot ATC chat window in a chat view for display on the portable device responsive to the selection of the locate element, the traffic view comprising:

a graphical symbol representation of the aircraft at the aircraft location;

graphical symbol representations of the traffic aircraft at the associated traffic aircraft locations, wherein the graphical symbol representation of the traffic aircraft associated with the aircraft traffic identifier in the chat entry is a highlighted graphical symbol representation; and the clearance data is associated with the selected one of the plurality of traffic aircraft.

14. The system of claim 8, wherein the at least one memory further comprises instructions that, upon execution by the at least one processor, cause the at least one processor to receive the plurality of clearance messages from a plurality of ground vehicles, wherein each of the plurality of ground clearance messages is associated with a ground vehicle and comprises a ground vehicle identifier, a ground clearance message time stamp, and ground clearance data associated with the one of the plurality of ground vehicles.

15. At least one non-transitory machine-readable storage medium that stores instructions executable by at least one processor, the instructions configurable to cause the at least one processor to perform operations comprising:

receiving an aircraft location of the aircraft from at least one geospatial sensor of the aircraft;

receiving traffic aircraft data including an aircraft identifier and a traffic aircraft location for each of a plurality of traffic aircraft from Automatic Dependent Surveillance-Broadcast (ADS-B);

generating a traffic aircraft display based on the aircraft location and the traffic aircraft data for display on a first display device on the aircraft, wherein the traffic aircraft display comprises a graphical representation of the aircraft at the aircraft location, graphical representations of each of the plurality of traffic aircraft at the associated traffic aircraft locations, and a selectable preview element;

receiving a plurality of clearance messages, wherein each of the plurality of clearance messages is associated with one of the plurality of traffic aircraft and comprises the aircraft identifier, a time stamp, and clearance data associated with the one of the plurality of traffic aircraft;

storing the aircraft identifier in association with the clearance data and the time stamp for each of the plurality of traffic aircraft in a traffic aircraft clearance table;

receiving a selection of the graphical representation of a first traffic aircraft from the traffic aircraft display, the first traffic aircraft having a first aircraft identifier and a selection of the preview element;

retrieving first clearance data corresponding to the first aircraft identifier having a first time-stamp and second clearance data corresponding to the first aircraft having a second time-stamp from the traffic clearance table responsive to the selection of the preview element, wherein the second time-stamp is prior to the first-time stamp; and regenerating the traffic aircraft display to include the first and second clearance data as a first tag associated with the graphical representation of the first traffic aircraft.

16. The at least one non-transitory machine-readable storage medium of claim 15, that stores further instructions configurable to cause the at least one processor to perform operations comprising receiving the plurality of clearance messages from a common traffic advisory frequency (CTAF).

17. The at least one non-transitory machine-readable storage medium of claim 15, that stores further instructions configurable to cause the at least one processor to perform operations comprising receiving the plurality of clearance messages from an air traffic control (ATC) communication frequency.

18. The at least one non-transitory machine-readable storage medium of claim 15, that stores further instructions configurable to cause the at least one processor to perform operations comprising:

generating the traffic aircraft display to include a selectable intent element;

receiving a selection of the intent element;

identifying most recent clearance data corresponding to the first aircraft identifier in the aircraft traffic clearance table responsive to selection of the intent element; and regenerating the traffic aircraft display to include the most recent clearance data as a second tag associated with the graphical representation of the first traffic aircraft.

19. The at least one non-transitory machine-readable storage medium of claim 15, that stores further instructions configurable to cause the at least one processor to perform operations comprising:

transcribing the plurality of clearance messages using a transcription engine to generate a plurality of transcribed clearance messages; and extracting the clearance data associated with each of the plurality of traffic aircraft from the transcribed clearance messages.

20. The at least one non-transitory machine-readable storage medium of claim 19, that stores further instructions configurable to cause the at least one processor to perform operations comprising:

generating a pilot ATC chat window in chat view comprising a plurality of chat entries for display on a portable device on the aircraft, each of the chat entries being associated with one of the plurality of traffic aircraft and comprising the traffic aircraft identifier and clearance data associated with the one of the plurality of traffic aircraft;

receiving selection of one of the plurality of chat entries;

responsively generating a selectable locate element associated with the selected one of the plurality of chat entries;

receiving a selection of the locate element; and generating the pilot ATC chat window in a chat view for display on the portable device responsive to the selection of the locate element, the traffic view comprising:

a graphical symbol representation of the aircraft at the aircraft location;

graphical symbol representations of the traffic aircraft at the associated traffic aircraft locations, wherein the graphical symbol representation of the traffic aircraft associated with the aircraft traffic identifier in the chat entry is a highlighted graphical symbol representation; and the clearance data is associated with the selected one of the plurality of traffic aircraft.

* * * * *